(12) United States Patent
Mitchell

(10) Patent No.: US 9,584,618 B1
(45) Date of Patent: Feb. 28, 2017

(54) HYBRID MOBILE INTERNET SYSTEM

(71) Applicant: Rockwell Collins, Inc., Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 298 days.

(21) Appl. No.: 14/300,810

(22) Filed: Jun. 10, 2014

(51) Int. Cl.
*G06F 17/30* (2006.01)
*H04L 29/08* (2006.01)
*H04W 4/18* (2009.01)

(52) U.S. Cl.
CPC .... *H04L 67/2842* (2013.01); *G06F 17/30861* (2013.01); *G06F 17/30876* (2013.01); *G06F 17/30893* (2013.01); *G06F 17/30902* (2013.01); *H04L 67/02* (2013.01); *H04L 67/12* (2013.01); *H04W 4/18* (2013.01)

(58) Field of Classification Search
CPC .............. H04N 21/8133; H04L 67/322; H04L 67/1095; H04L 41/0681; H04L 29/12066; H04L 67/2842; H04H 60/33; H04B 7/18508; G06F 9/505; G06F 17/30861; G06F 17/30902; G06F 17/30876; G06F 17/30893; H04W 4/18
See application file for complete search history.

(56) References Cited

U.S. PATENT DOCUMENTS

| | | | |
|---|---|---|---|
| 6,741,841 B1* | 5/2004 | Mitchell | H04B 7/18508 348/E7.093 |
| 8,176,520 B1 | 5/2012 | Mitchell | |
| 2002/0163910 A1* | 11/2002 | Wisner | H04L 41/0681 370/389 |
| 2002/0183059 A1* | 12/2002 | Noreen | H04H 60/33 455/414.1 |
| 2006/0112176 A1* | 5/2006 | Liu | H04L 29/12066 709/245 |
| 2009/0327489 A1* | 12/2009 | Swildens | G06F 9/505 709/224 |
| 2013/0013764 A1* | 1/2013 | Li | H04L 67/322 709/224 |
| 2015/0052192 A1* | 2/2015 | Chauhan | H04L 67/1095 709/203 |
| 2015/0350746 A1* | 12/2015 | Tomita | H04N 21/8133 725/34 |

* cited by examiner

*Primary Examiner* — Le Luu
(74) *Attorney, Agent, or Firm* — Angel N. Gerdzhikov; Donna P. Suchy; Daniel M. Barbieri

(57) ABSTRACT

A computer system identifies a subset of internet content of interest to a future set of passengers for a particular flight. The computer system compiles the subset of the internet content in advance of the flight and delivers the subset of internet content to a corresponding airport gate. A routing table of individual pages and links in those individual pages is constructed. A computer system with a large data storage element in an aircraft receives the subset of internet content and delivers it to passengers on demand, in flight.

20 Claims, 4 Drawing Sheets

HYBRID MOBILE INTERNET SYSTEM

FIELD OF THE INVENTION

The present invention is directed generally toward internet service in aircraft, and more particularly toward a system for providing offline internet service.

BACKGROUND OF THE INVENTION

Satellite communication in aircraft generally requires twelve to thirty-six inch Ku and Ka band antennas. Satellite communication is necessary for high speed data communication in an aircraft. Smaller aircraft are limited in size and do not have adequately fuselages space to carry the antennas necessary for high speed Internet access. Thousands of existing single aisle aircraft are capable of hosting on-board wireless access, but are limited to on-board movies and games without any internet connectivity.

Consequently, it would be advantageous if an apparatus existed that is suitable for providing internet access in aircraft incapable of housing Ku and Ka band antennas.

SUMMARY OF THE INVENTION

Accordingly, the present invention is directed to a novel method and apparatus for providing internet access in aircraft incapable of housing Ku and Ka band antennas.

In at least one embodiment, a computer system in an aircraft comprises a large data storage element for storing a subset of internet data. A predetermined subset of internet data is compiled and stored at an airport for transfer to an aircraft when the aircraft is stationed at the airport gate. A routing table is constructed corresponding to the individual pages in the subset of the internet data and to the links in those individual pages as necessary.

In another embodiment, a computer system identifies a subset of internet data of interest to a future set of passengers for a particular flight. The computer system compiles the subset of the internet data in advance of the flight and delivers the subset of internet data to a corresponding airport gate.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
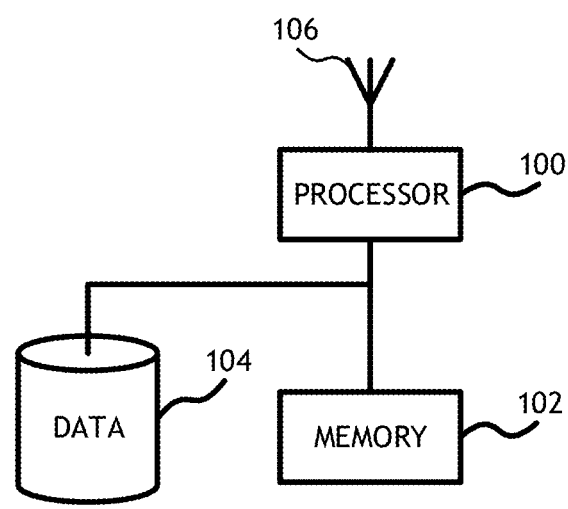
FIG. 1 shows a block diagram of a computer system for storing a subset of internet data according to at least one embodiment of the present invention.

Referring to FIG. 1, a block diagram of a computer system for storing a subset of internet data according to at least one embodiment of the present invention is shown. In at least one embodiment, a computer system incorporated into an aircraft may include a processor 100, memory 102 connected to the processor 100 configured to store computer executable program code, a data storage element 104 connected to the processor 100 configured to store a subset of internet data. The computer system may also include one or more antennas 106 connected to the processor 100; the one or more antennas 106 configured to transfer the subset of internet data to the data storage element 104 from a corresponding computer system at an airport gate, and further configured to allow access to the subset of internet data by passengers of the aircraft.

The memory 102 may also store a routing table corresponding to pages and links in the subset of internet data. The routing table may be configured to redirect requests for internet data received through the one or more antennas 106 to locally stored data in the data storage element 104, or else to gracefully fail when a passenger attempts to access data that is not stored in the data storage element 104. Alternatively, the processor 100 may utilize the routing table to identify any attempt to access data not stored in the data storage element and offer a passenger the opportunity to use any available data connection. In that case, the one or more antennas 106 may be further configured for some form of in-air data communication to provide limited real-time internet access. A person skilled in the art may appreciate a "routing table" according to the present invention may comprise any data structure for allowing the translation and routing of general internet addresses to addresses specific to locally stored data. In at least one embodiment, such routing table may comprise a simple methodology for IP translation.

Figure 2:
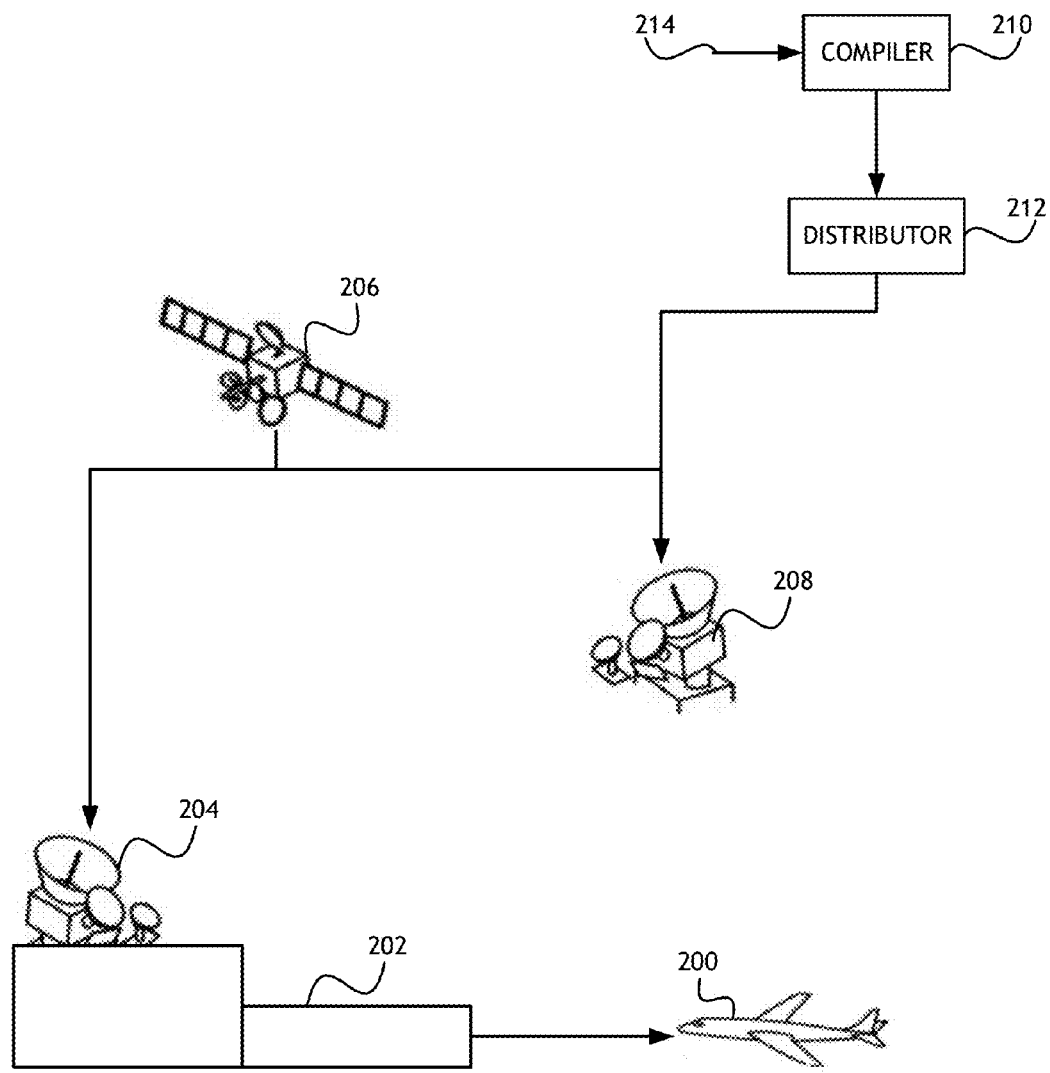
FIG. 2 shows a block diagram of a system for delivering a subset of internet data to an aircraft according to at least one embodiment of the present invention.

Referring to FIG. 2, a block diagram of a system for delivering a subset of internet data to an aircraft according to at least one embodiment of the present invention is shown. An aircraft 200 including a computer system configured to store a subset of internet data is in data communication with a computer system in an airport 202. In some embodiments, the aircraft 200 computer system may be wirelessly or physically connected to the airport 202 computer system.

The airport 202 computer system may receive a subset of internet data designated for upload to the aircraft 200 computer system. In at least one embodiment, the airport 202 computer system may receive the subset of internet data through a satellite enabled data link 204 to a high speed data communication satellite system 206. The high speed data communication satellite system 206 may be configured to relay subsets of internet data from an airport data distribution system 208.

The subset of internet data may be compiled 210 by an entity such as an internet search provider or other entity that maintains one or more indexes of internet content. The subset of internet data may be compiled 210 based on compilation parameters 214 supplied by an airline. The compilation parameters 214 may be general website popularity metrics, desired websites as indicated by prospective or actual airline passengers, websites that airlines wish to make available to passengers, websites determined to be likely desirable based on passenger profile information gathered by an airline or any other combination of parameters capable of distinguishing desirability of some websites as compared to others.

Once the subset of internet data is compiled 210, the subset of internet data may be distributed 212 to one or more airports through the airport data distribution system 208. Where the subset of internet data is specific to a particular flight, the distribution 212 may be directed toward a particular gate at a particular airport 202. Where the subset of internet data is more generalized, the distribution 212 may be directed toward a plurality of airports 202. Distribution 212 may comprise incorporating one or more routing tables configured to translate website address in the subset of internet data. The routing table may further translate links in websites in the subset of internet data to point to other websites in the subset of internet data where appropriate.

Furthermore, websites included in the subset of internet data may incorporate server-side, dynamically generated content such as advertisements. Such dynamically generated content may be identified during compilation 210, distribution 212 or on-board the aircraft 200 computer system when accessed by a passenger. The identified, dynamically generated content may be replaced by static content.

Figure 3:
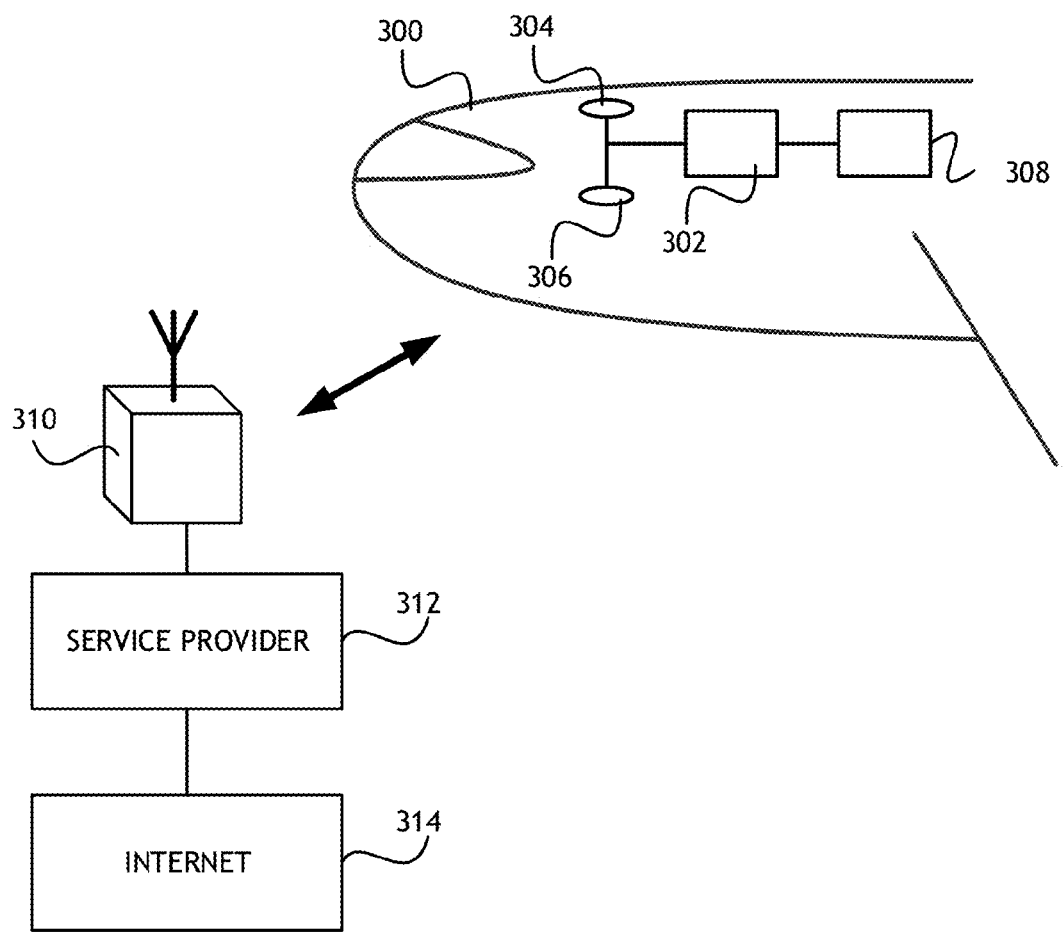
FIG. 3 shows an environmental block diagram of an aircraft receiving a subset of internet data according to at least one embodiment of the present invention.

Referring to FIG. 3, an environmental block diagram of an aircraft receiving a subset of internet data according to at least one embodiment of the present invention is shown. An aircraft 300 according to at least one embodiment of the present invention includes a server 308 configured to provide a subset of internet data to aircraft 300 passengers through a wireless access point 302. The wireless access point 302 may comprise one or more antennas 304, 306, at least one of the one or more antennas 304, 306 configured to establish a data link connected with an airport gate server system 310 for high speed transfer of the subset of internet data from the airport gate server system 310 to the aircraft 300 server 308 when the aircraft 300 is stationed at an airport gate. In another embodiment, the server 308 may be connected through a physical datalink to the airport gate server 310. For example, when aircraft 300 are parked at an airport gate, temporary power connections are routinely established to the aircraft 300. A physical datalink connection may be established between the airport gate server system 310 and the aircraft 300 server 308 through the temporary power connection. Alternatively, a dedicated, temporary, high-bandwidth physical connection may be made alongside existing power connections.

The airport gate server system 310 may communicate with one or more service providers 312 such as Google, Microsoft, Yahoo, Baidu or some other entity that maintains one or more indexes of internet data 314. The one or more service providers 312 may compile a subset of internet data 314 based on parameters provided by an airline for transfer to the server 308 and eventual access by passengers of the aircraft 300 in flight. Furthermore, where some portion of the subset of internet data 314 is determined to be relatively persistent across multiple flights, the airport gate server system 310 may periodically update the subset of internet data 314 to reflect updates to the internet.

Figure 4:
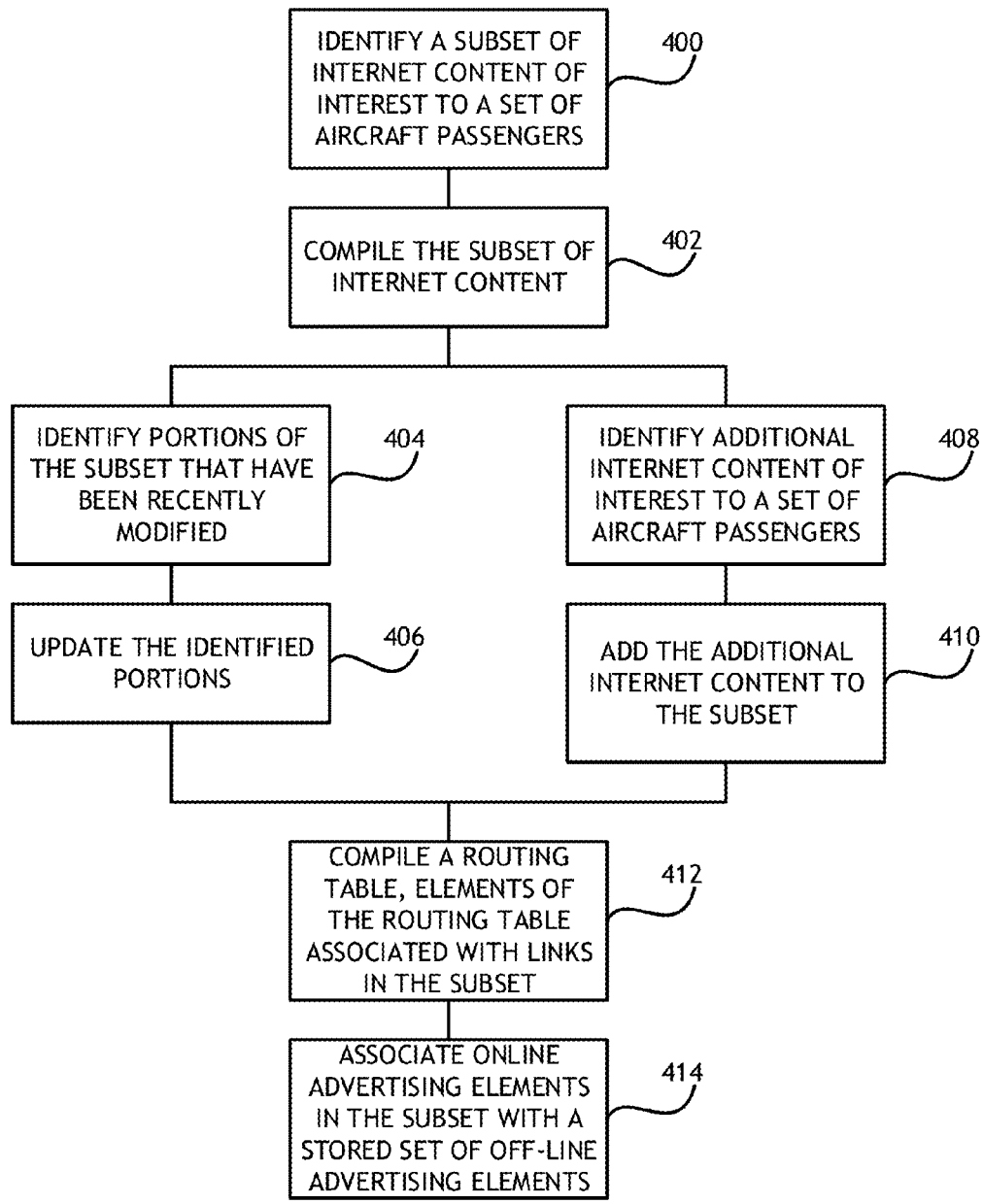
FIG. 4 shows a flowchart of a method according to at least one embodiment of the present invention.

Referring to FIG. 4, a flowchart of a method according to at least one embodiment of the present invention is shown. A computer system may identify 400 a subset of internet data based on parameters supplied by an airline. Such parameters may define what internet content is desired by aircraft passengers generally, or a particular set of aircraft passengers or both. Internet content desired by a particular set of aircraft passengers may be identified based on passenger profiles or specific passenger requests.

The desired internet content may then by compiled 402 into a server system in an airport, and in some cases a particular airport gate. The desired internet content may be partially or substantially consistent between flights. In such case, the server system may identify 404 portions of the internet content that have been updated or modified since original compilation 402 and update 406 the modified internet content to reflect the most recent version available.

In addition, a compilation of internet content may be generalized such that a basic content set may be compiled 402 for all flights and additional internet content may be identified 408 for a specific passenger set and added 410 to the compiled internet content.

Internet locations are generally identified by a domain name system. Because embodiments of the present invention are indented for use in an aircraft without high-speed internet connectivity, an ordinary domain name system may not be available. Therefore, a routing table may be compiled 412 of the subset of internet content to accurately route data traffic.

Where the subset of internet content includes dynamically generated features, the dynamically generated features may be replaced 414 by static features stored in a server system. For example, where a website would normally generate advertisements during an initial loading, such advertisements may be replaced by elements stored locally; for example, by static advertisements.

In another embodiment of the present invention, similar systems and methodologies may be employed in non-aircraft, mobile devices. In such embodiment, a mobile device may connect to a service provider when such a data link connection is available. The mobile device may download a subset of internet data according to one or more preferences of the device owner. The device may maintain a routing table associating the subset of internet data and links within the subset of internet data with websites within the subset of internet data. The mobile device may recognize when no data link connection to the internet is available instead route data access requests according to the routing table.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing a subset of internet content in an off-line environment, comprising:
 a processor;
 memory connected to the processor;
 a data storage element connected to the processor; and
 a wireless data communication element connected to the processor,
 wherein:
  the data storage element is configured to store a subset of internet content;

the memory is configured to store a routing table, the routing table configured to relate website addresses to websites in the subset of internet content;

the processor is configured to:

receive a data access request through the wireless data communication element;

translate the data access request with reference to the routing table to a website in the subset of internet content;

identify dynamically generated advertising elements;

replace the dynamically generated advertising elements with static advertising elements; and deliver the website in the subset of internet content.

2. The system of claim 1, further comprising an airport side content delivery server system, wherein the airport side content delivery server system is configured to:

receive a subset of internet content;

establish a data link connection to the processor; and transfer the subset of internet content to the data storage element.

3. The system of claim 2, further comprising a compiler configured to compile selected internet content into a subset of internet content.

4. The system of claim 3, wherein the compiler is configured to compile the selected internet content based on one or more parameters supplied by an airline.

5. The system of claim 4, wherein the one or more parameters comprise one or more passenger profiles.

6. The system of claim 2, wherein the airport side content delivery server system is further configured to:

identify dynamic content in the subset of internet content; and replace the dynamic content in the subset if internet content with static content.

7. The system of claim 1, wherein the processor is further configured to:

identify dynamic content in the subset of internet content; and replace the dynamic content in the subset if internet content with static content.

8. The system of claim 1, wherein:

the subset of internet content comprises a timestamp; and delivering the website in the subset of internet content comprises displaying the timestamp.

9. An aircraft comprising:

a processor;

memory connected to the processor;

a data storage element connected to the processor; and a wireless data communication element connected to the processor, wherein:

the data storage element is configured to store a subset of internet content;

the memory is configured to store a routing table, the routing table configured to relate website addresses to websites in the subset of internet content;

the processor is configured to:

receive a data access request through the wireless data communication element;

translate the data access request with reference to the routing table to a website in the subset of internet content;

identify dynamically generated advertising elements;

replace the dynamically generated advertising elements with static advertising elements; and deliver the website in the subset of internet content.

10. The aircraft of claim 9, wherein the processor is further configured to receive the subset of internet content through the wireless data communication element.

11. The aircraft of claim 9, wherein the processor is further configured to receive the subset of internet content through a dedicated, temporary, high-bandwidth wired datalink.

12. The aircraft of claim 9, wherein the processor is further configured to:

identify dynamic content in the subset of internet content; and replace the dynamic content in the subset if internet content with static content.

13. A method for providing a subset of internet content to aircraft passengers in-flight, comprising:

storing a subset of internet content;

compiling a routing table configured to relate website addresses to websites in the subset of internet content;

receiving a data access request through the wireless data communication element;

translating the data access request with reference to the routing table to a website in the subset of internet content;

identifying dynamically generated advertising elements;

replacing the dynamically generated advertising elements with static advertising elements; and delivering the website in the subset of internet content.

14. The method of claim 13, further comprising:

receiving a subset of internet content;

establishing a data link connection to an aircraft; and transferring the subset of internet content to the aircraft.

15. The method of claim 14, further comprising:

identifying dynamic content in the subset of internet content; and replacing the dynamic content in the subset if internet content with static content.

16. The method of claim 14, further comprising compiling selected internet content into the subset of internet content.

17. The method of claim 16, further comprising updating content in the subset of internet content.

18. The method of claim 16, wherein compiling the selected internet content comprises receiving one or more parameters supplied by an airline.

19. The method of claim 18, wherein the one or more parameters comprise one or more passenger profiles.

20. The method of claim 18, wherein the one or more parameters comprise one or more passenger selected websites.

* * * * *